United States Patent
Bourne et al.

(10) Patent No.: US 7,353,402 B2
(45) Date of Patent: Apr. 1, 2008

(54) OBTAINING A SIGNED RIGHTS LABEL (SRL) FOR DIGITAL CONTENT AND OBTAINING A DIGITAL LICENSE CORRESPONDING TO THE CONTENT BASED ON THE SRL IN A DIGITAL RIGHTS MANAGEMENT SYSTEM

(75) Inventors: Steven Bourne, Seattle, WA (US); Prashant Malik, Bellevue, WA (US); Vinay Krishnaswamy, Woodinville, WA (US); James B. Shobe, Jr., Seattle, WA (US); Chandramouli Venkatesh, Sammamish, WA (US); Attila Narin, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 10/185,527

(22) Filed: Jun. 28, 2002

(65) Prior Publication Data

US 2004/0003270 A1    Jan. 1, 2004

(51) Int. Cl.
*H04L 9/00* (2006.01)

(52) U.S. Cl. ...................... 713/193; 713/180; 713/183; 726/2; 726/26; 705/1; 705/26; 705/27

(58) Field of Classification Search ................ 713/193, 713/180; 726/2, 26; 705/1, 26, 27
See application file for complete search history.

(56) References Cited

U.S. PATENT DOCUMENTS 5,715,403 A    2/1998    Stefik ......................... 395/244

| | | | |
|---|---|---|---|
| 6,189,146 B1 * | 2/2001 | Misra et al. | 717/177 |
| 6,226,618 B1 * | 5/2001 | Downs et al. | 705/1 |
| 6,389,535 B1 * | 5/2002 | Thomlinson et al. | 713/165 |

(Continued)

FOREIGN PATENT DOCUMENTS

WO    WO 00/58811    10/2000

(Continued)

OTHER PUBLICATIONS

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

(Continued)

*Primary Examiner*—Nasser Moazzami
*Assistant Examiner*—Carl Colin
(74) *Attorney, Agent, or Firm*—Woodcock Washburn LLP

(57) ABSTRACT

Content is encrypted according to a content key (CK) ((CK(content))), (CK) is protected according to a license server public key (PU-DRM), and rights data associated with the content is protected according to (PU-DRM). The protected items are submitted as a rights label to the license server for signing. The license server validates the rights label and, if valid, digitally signs based on the protected rights data to result in a signed rights label (SRL), and returns same. The SRL is concatenated with (CK(content)) and both are distributed to a user. To render the content, the user submits the SRL to the license server to request a license. The license server verifies the SRL signature and reviews the SRL protected rights data to determine whether the user is entitled to the license, and if so issues the license, including (CK) in a protected form accessible to the user.

28 Claims, 13 Drawing Sheets

U.S. PATENT DOCUMENTS

| | | | |
|---|---|---|---|
| 6,446,207 B1 * | 9/2002 | Vanstone et al. | 713/180 |
| 6,859,790 B1 * | 2/2005 | Nonaka et al. | 705/51 |
| 6,961,858 B2 * | 11/2005 | Fransdonk | 726/29 |
| 6,973,444 B1 * | 12/2005 | Blinn et al. | 705/51 |
| 7,017,188 B1 * | 3/2006 | Schmeidler et al. | 726/26 |
| 7,058,819 B2 * | 6/2006 | Okaue | 713/193 |
| 7,213,005 B2 * | 5/2007 | Mourad et al. | 705/64 |
| 2002/0013772 A1 | 1/2002 | Peinado | 705/51 |

FOREIGN PATENT DOCUMENTS

| | | |
|---|---|---|
| WO | WO 00/59150 | 10/2000 |
| WO | WO 01/52021 A1 | 7/2001 |
| WO | WO 02/01335 A2 | 1/2002 |
| WO | WO 02/23315 A2 | 3/2002 |
| WO | WO 02/37371 A1 | 5/2002 |

OTHER PUBLICATIONS

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Griswold, G.N. "A Method for Protecting Copyright on Networks", *IMA Intell. Property Project Proceedings*, Jan. 1994, 1(1), 169-178.

Gunter, C.A., et al. "Models and Languages for Digital Rights", *Proceedings of the 34th Annual Hawaii International Conference on System Sciences*, 2001, 5.

Kahn, R.E. "Deposit, Registration and Recordation in an Electronic Copyright Management System", *IMA Intellectual Property Project Proceedings*, Jan. 1994, 1(1), 111-120.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management",*IEEE, Proceedigns 2002 IEEE 4th International Workshop on Networked Appliances*, 2002, 49-56.

"Managing digital rights in online publishing", *Information Management & Technology*, 2001, 34(4), 168-169.

* cited by examiner

| SRL 308 | CONTENT INFO | DRM SERVER INFO | -(PU-DRM(DES1)) | -REFERRAL INFO | --URL | --FALL-BACK | RIGHTS LABEL INFO | (DES1(RIGHTSDATA)) | (DES1(CK)) | S (PR-DRM) |

FIG. 4A

OBTAINING A SIGNED RIGHTS LABEL (SRL) FOR DIGITAL CONTENT AND OBTAINING A DIGITAL LICENSE CORRESPONDING TO THE CONTENT BASED ON THE SRL IN A DIGITAL RIGHTS MANAGEMENT SYSTEM

CROSS-REFERENCE TO RELATED APPLICATIONS

The following U.S. Patent Applications disclose subject matter that is related to the subject matter of the present application, and each is hereby incorporated herein by reference:

U.S. patent application Ser. No. 10/185,278, filed concurrently with the present application and entitled "Using a Rights Template to Obtain a Signed Rights Label (SRL) for Digital Content in a Digital Rights Management System"; and U.S. patent application Ser. No. 10/185,111, filed concurrently with the present application and entitled "Systems And Methods For Issuing Usage Licenses For Digital Content And Services".

TECHNICAL FIELD

This invention relates to a digital rights management (DRM) system. More particularly, the invention relates to steps performed in obtaining a signed rights label (SRL) from a license server for a piece of digital content, and steps performed in obtaining a digital license corresponding to the content from the license server.

BACKGROUND OF THE INVENTION

Digital rights management and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders or 'plays' the digital content with the aid of an appropriate rendering device such as a media player on a personal computer or the like.

In one scenario, a content owner or rights-owner such as an author, a publisher, a broadcaster, etc., wishes to distribute such digital content to each of many users or recipients in exchange for a license fee or some other consideration. In such scenario, then, the content may be a song, an album of songs, a movie, etc., and the purpose of the distribution is to generate the license fees. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be played only a limited number of times, only for a certain total time, only on a certain type of machine, only on a certain type of media player, only by a certain type of user, etc.

In another scenario, a content developer, such as an employee in an organization, wishes to distribute such digital content to one or more other employees in the organization or to other individuals outside the organization, but would like to keep others from rendering the content. Here, the distribution of the content is more akin to organization-based content sharing in a confidential or restricted manner, as opposed to broad-based distribution in exchange for a license fee or some other consideration. In such scenario, then, the content may be a document presentation, spreadsheet, database, email, or the like, such as may be exchanged within an office setting, and the content developer may wish to ensure that the content stays within the office setting and is not rendered by non-authorized individuals, such as for example competitors or adversaries. Again, such content developer wishes to restrict what a recipient can do with such distributed digital content. For example, the content owner would like to restrict the user from copying and re-distributing such content to a second user, at least in a manner that exposes the content outside the bounds of individuals who should be allowed to render the content.

In addition, the content developer may wish to provide various recipients with different levels of rendering rights. For example, the content developer may wish to allow protected digital content to be viewable and not printable with respect to one class of individual, and viewable and printable with respect to another class of individual.

However, and in either scenario, after distribution has occurred, such content owner/developer has very little if any control over the digital content. This is especially problematic in view of the fact that practically every personal computer includes the software and hardware necessary to make an exact digital copy of such digital content, and to download such exact digital copy to a write-able magnetic or optical disk, or to send such exact digital copy over a network such as the Internet to any destination.

Of course, as part of a transaction wherein the content is distributed, the content owner/developer may require the user/recipient of the digital content to promise not to re-distribute such digital content in an unwelcome manner. However, such a promise is easily made and easily broken. A content owner/developer may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

A need exists, then, for providing a digital rights management and enforcement architecture and method that allows the controlled rendering or playing of arbitrary forms of digital content, where such control is flexible and definable by the content owner/developer of such digital content. More specifically, a need exists for such an architecture that allows and facilitates such controlled rendering, especially in an office or organization environment or the like where documents are to be shared amongst a defined group of individuals or classes of individuals.

SUMMARY OF THE INVENTION

The invention satisfies the aforementioned needs in the art by providing systems and methods for issuing usage licenses for digital content and services via a signed rights label. According to the invention, a digital rights management ("DRM") license issuing component issues licenses that enable another software application or component to consume digital content or services according to terms dictated by the license. To issue a license, the license-issuing component uses a rights label that specifies a set of terms from which it is possible to issue a single specific license. The license terms specify the rights, conditions, and principals for usage of the content or service. A "right," as that term is used herein, refers to a specific action that is understood by the consuming component (for example, "Play" for a digital media player or "Edit" for a document management system). A "condition," as that term is used herein, refers to specific criteria that must be met before the consuming component can allow the consumption to occur (for example, "No later than December 1"). In addition, the license can also include cryptographic key material that is used to unlock the protected content or server that is being licensed. A rights label according to the invention includes a definition that delimits the boundaries of all licenses that can permissibly be issued with respect to the content or service with which the rights label is associated. Thus, in general, a license includes a subset of the rights and conditions specified in the rights label.

The invention may be embodied as a protocol and/or application program and/or applications program interface (API) to perform functions including: receiving a rights description and associated protected cryptographic key material for a piece of content; validating and creating digital signatures over this data in order to create the rights label; allowing an application to request a license for a piece of content; enabling the DRM licensing server to perform an authorization check on the above-mentioned request; enabling the DRM licensing server to issue a license to the requestor based on the request; and to protect the content's cryptographic material to the application or user making the request.

In one embodiment of the present invention, digital content is published to enable a license server to issue a digital license corresponding to the content to one or more users desiring to render the content. The content is encrypted according to a content key (CK) to result in (CK(content)), the content key (CK) is protected according to a public key for the license server (PU-DRM), and rights data associated with the content is generated and protected according to (PU-DRM).

The protected rights data and the protected content key (CK)) are submitted as a rights label to the license server for signing thereby. The license server validates the rights label and, if valid, creates a digital signature based on a private key (PR-DRM) corresponding to (PU-DRM) and based at least in part on the protected rights data to result in a signed rights label (SRL), and then returns the SRL.

The returned SRL is received and concatenated with (CK(content)) to form a content package, and the content package is distributed to the one or more users. A user desiring to render the content retrieves the SRL from the content package and submits the retrieved SRL to the license server as part of a request for the license corresponding to the content. The license server verifies the signature of the SRL based on (PU-DRM) and based at least in part on the protected rights data, accesses the protected rights data in the SRL and reviews same to determine whether the user is entitled to the license, and if so issues the license to the user. The license includes (CK) in a protected form accessible to the user.

BRIEF DESCRIPTION OF THE SEVERAL VIEWS OF THE DRAWING

Other features of the invention are further apparent from the following detailed description of the embodiments of the present invention taken in conjunction with the accompanying drawing.

FIG. 4A is a block diagram showing the structure of a signed rights label as produced by the method of FIG. 4.

DETAILED DESCRIPTION OF THE INVENTION

Exemplary Computing Device

Figure 1:
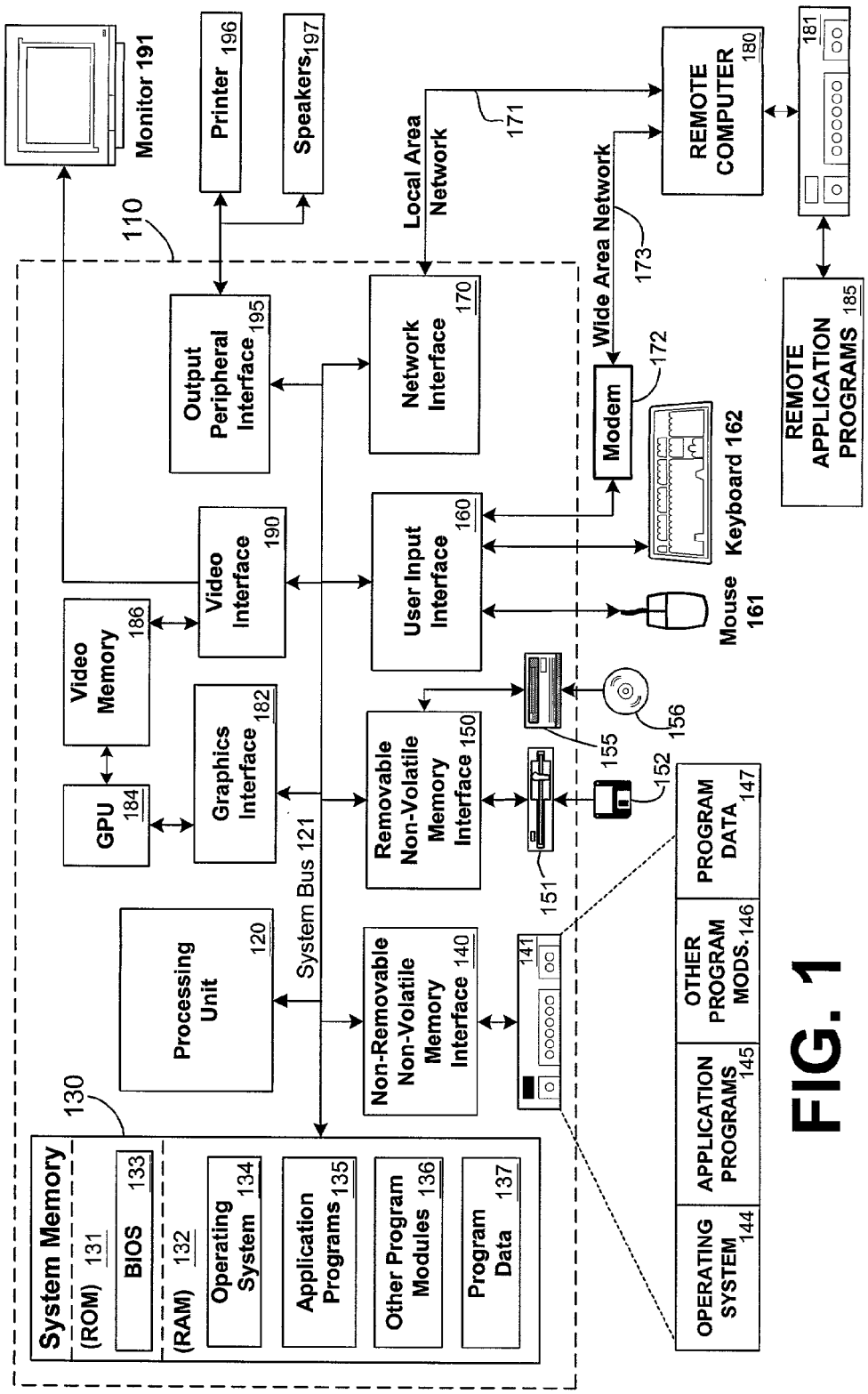
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by environment 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the environment 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in environment 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
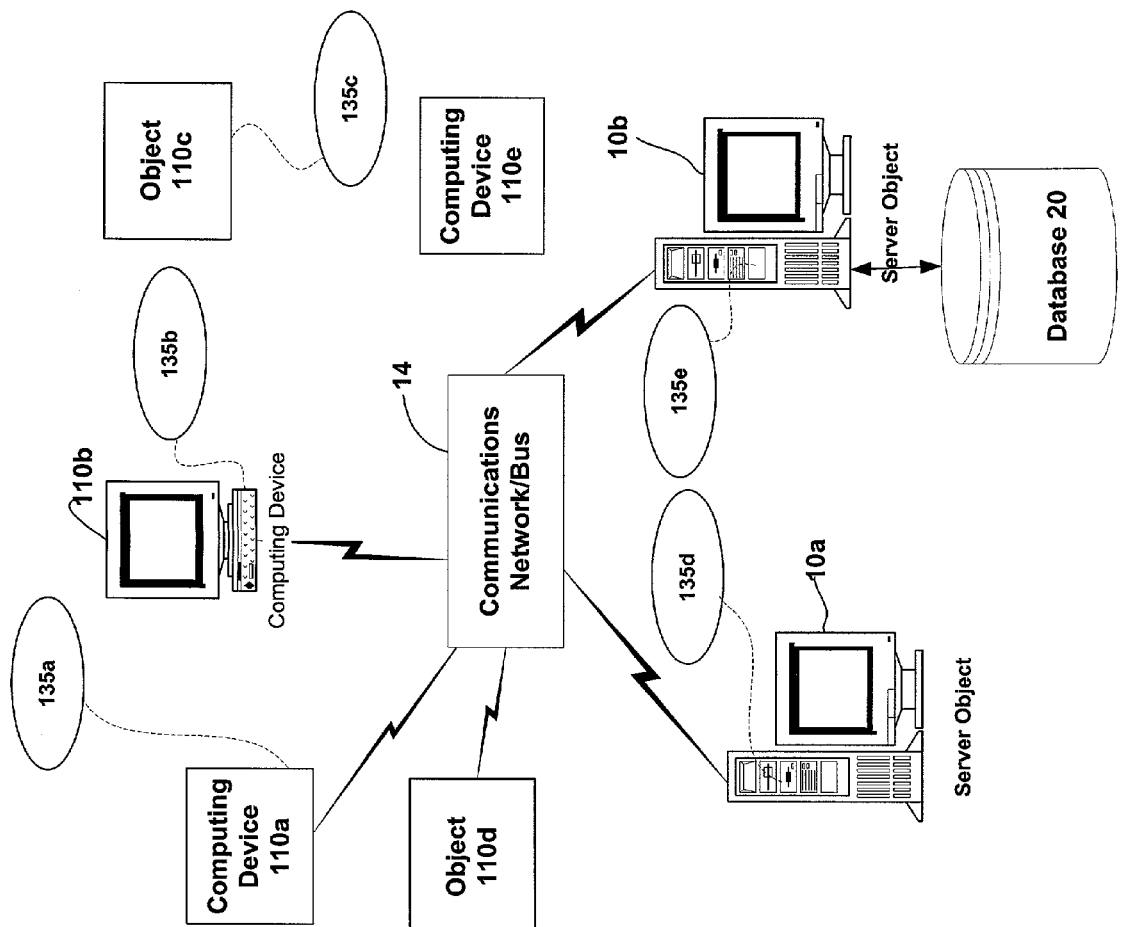
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Digital Rights Management (DRM) Overview

Figure 11:
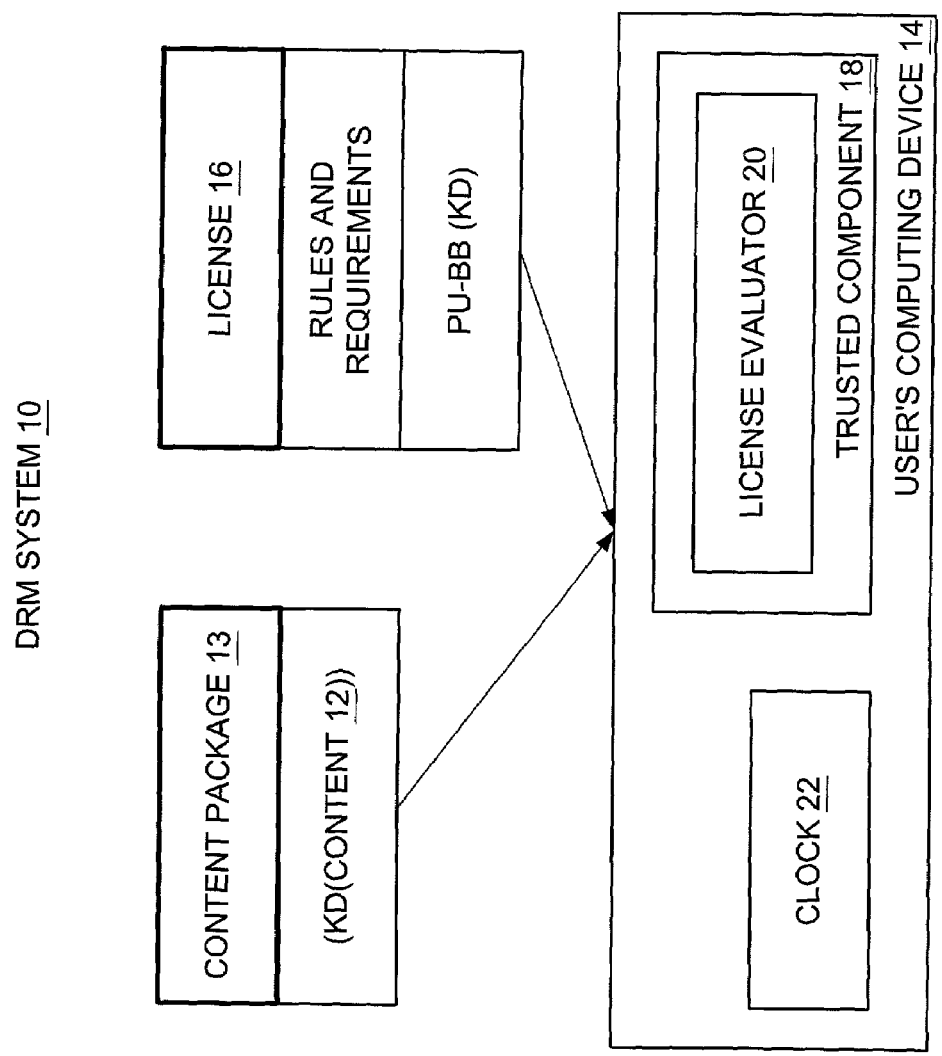
FIG. 11 is a block diagram showing an enforcement architecture of an example of a trust-based system.

As is known, and referring now to FIG. 11, digital rights management (DRM) and enforcement is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner or developer (hereinafter 'owner') distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise)

must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.). Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD(CONTENT)) from the content package 13 to result in the actual content 12, and the actual content 12 is then in fact rendered.

Publishing Digital Content

Figure 3:
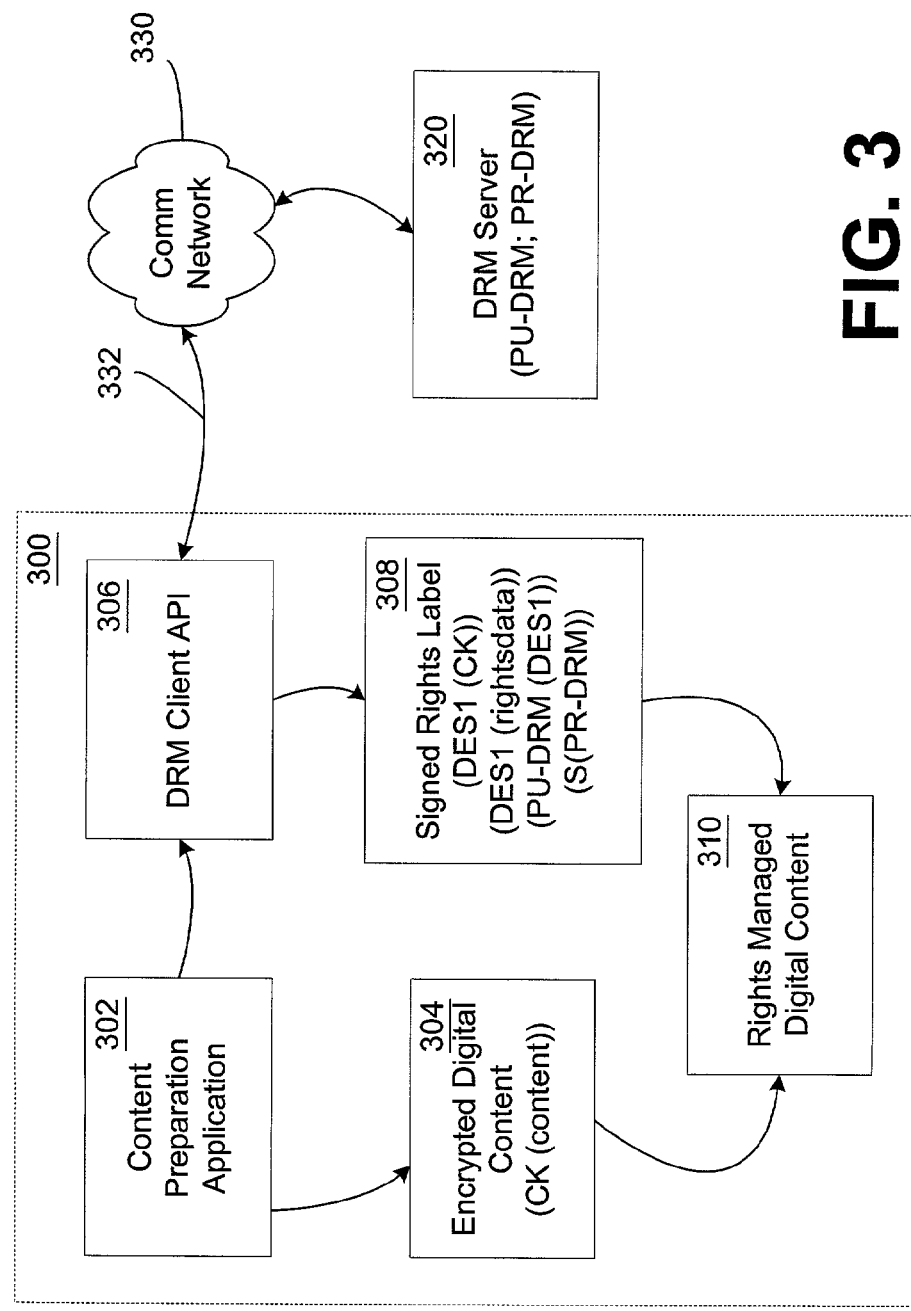
FIG. 3 is a functional block diagram of a preferred embodiment of a system and method according to the invention for publishing digital content.

FIG. 3 is a functional block diagram of a preferred embodiment of a system and method according to the invention for publishing digital content. "Publishing," as that term is used herein, refers to a process that an application or service follows to establish with a trusted entity a set of rights and conditions that the entity can issue for that content, as well as to whom those rights and conditions can be issued. According to the invention, the publishing process includes encrypting the digital content and associating a list of persistent enforceable rights that the author of the content intended for all possible users of the content. This process can be carried out in a secure way to prohibit access to any of the rights or to the content unless intended by the author of the content.

In a preferred embodiment of the invention, three entities in particular can be employed to publish secure digital content: a content preparation application 302 that executes on the client 300 and prepares the content for publishing, a digital rights management (DRM) applications program interface (API) 306 that also resides on the client device 300, and a DRM server 320 that is communicatively coupled to the client 300 via a communication network 330. In a preferred embodiment of the invention, the communication network 330 includes the Internet, though it should be understood that the communication network 330 could be any local or wide area network, such as a proprietary intranet, for example.

The content preparation application 302 can be any application that produces digital content. For example, the application 302 can be a word processor or other publisher that produces digital text files, digital music, video, or other such content. The content could also include streamed content, such as streamed audio/video of a live or taped event, or example. According to the invention, the content preparation application invites the user thereof to encrypt the content using a key that the user provides. The application 302 uses the key to encrypt the digital content, thus forming an encrypted digital content file 304. The client application also invites the user to provide rights data for the digital content file 304. The rights data includes a respective identity for each entity that has rights in the digital content. Such an entity can be, for example, an individual, a class of individuals, or a device. For each such entity, the rights data also includes a list of rights that that entity has in the content, and any conditions that may be imposed on any or all of those rights. Such rights can include the right to read, edit, copy, print, etc, the digital content. Additionally, rights can be inclusive or exclusive. Inclusive rights indicate that a specified user has a specified right in the content (e.g., the user can edit the digital content). Exclusive rights indicate that a specified user has all rights in the content except those specified (e.g., the user can do anything with the digital content except copy it).

According to one embodiment of the invention, the client API 306 can pass the encrypted digital content and the rights data to the DRM server 320. Using a process that is described in detail below, the DRM server 320 determines whether it can enforce the rights that the user has assigned and, if so, the DRM server 320 signs the rights data to form a signed rights label (SRL) 308. In general, however, any trusted entity can sign the rights data, preferably using a key trusted by the DRM server 320. For example, a client can sign the rights data using a key provided to it by the DRM server 320.

The rights label can include data representing the rights description, the encrypted content key, and the digital signature over the rights description and the encrypted content key. If the DRM server is signing the rights label, it passes the signed rights label 308 back to the client through the client API 306, which stores the signed rights label 308 on the client device 300. The content preparation application 302 then associates the signed rights label 308 with the encrypted digital content file 304. For example, the SRL 308 can be concatenated with the encrypted digital content file to form a rights managed content file 310. In general, however, the rights data need not be combined with the digital content. For example, the rights data could be stored in a known location, and a reference to the stored rights data could be combined with the encrypted digital content. The reference could include an identifier that indicates where the rights data is stored (e.g., the data store that contains the rights data), and an identifier that corresponds to that particular rights data at that particular storage location (e.g., that identifies the file that contains the particular rights data of interest). The rights managed content 310 can then be delivered to anyone anywhere, and only those entities that have rights to consume the content can consume the content, and only in accordance with the rights they were assigned.

Figure 4:
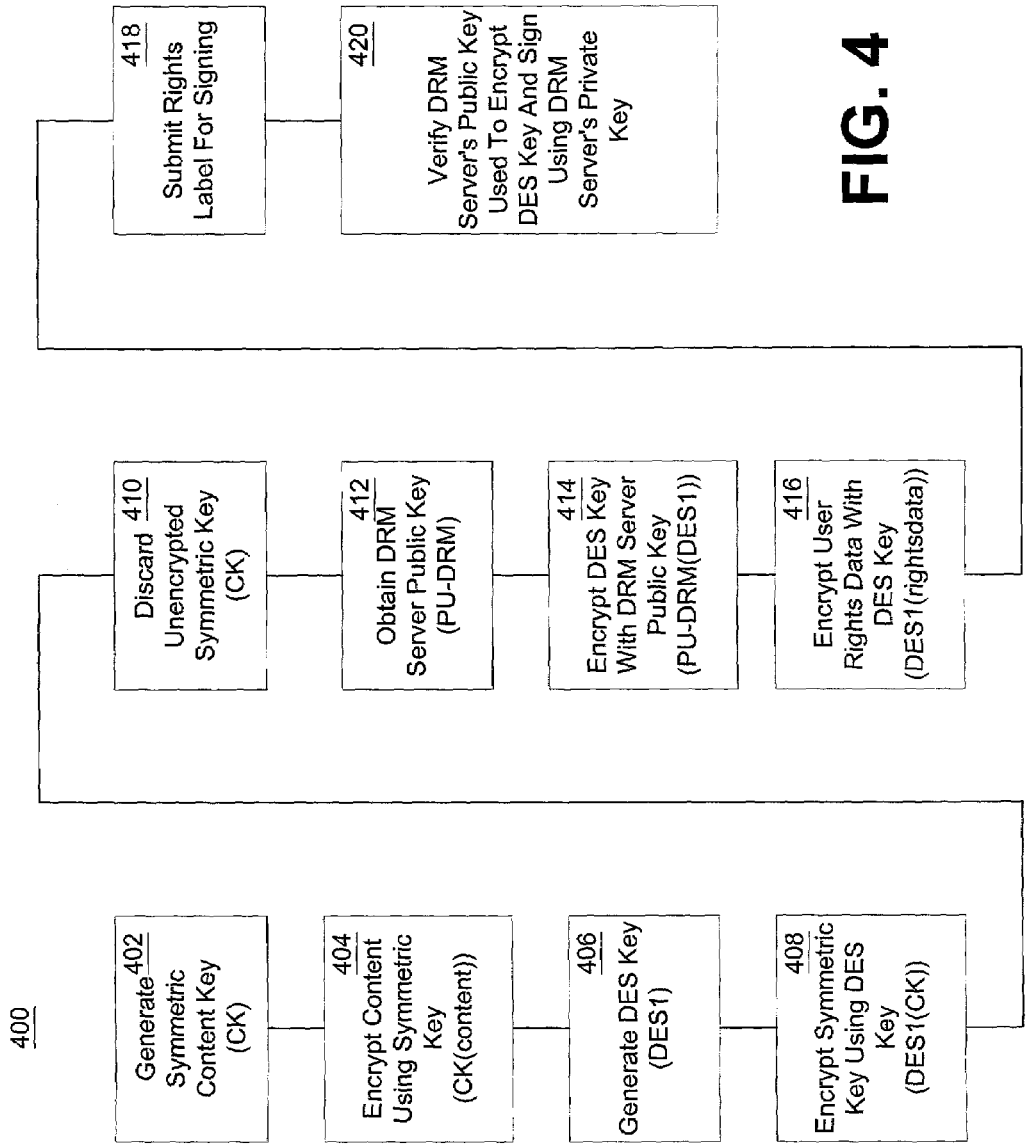
FIG. 4 provides a flowchart of a preferred embodiment of a method according to the invention for publishing rights managed digital content.

FIG. 4 is a flowchart of an exemplary method 400 according to the invention for publishing rights managed digital content, wherein the rights label is signed by a DRM server. It should be understood however, that this embodiment is merely exemplary, and that the rights label can be signed, in general, by any trusted entity. Generally, a method according to the invention for publishing digital content can include: encrypting the digital content using a content key (CK), generating a rights description associated with the digital content, encrypting the content key (CK) according to a public key for a DRM server (PU-DRM) to result in (PU-DRM(CK)), and creating a digital signature based on a private key (PR-DRM) corresponding to (PU-DRM) over the combination of the rights description and (PU-DRM (CK)).

At step 402, the application 302 generates a content key (CK) that is used to encrypt the digital content. Preferably, the content key (CK) is a symmetric key, though, in general, any key can be used to encrypt the digital content. Symmetric key algorithms, which are sometimes referred to as "secret key" algorithms, use the same key to decrypt a message as they do to encrypt the message. For that reason, it is preferred that (CK) be kept secret. Sharing (CK) between sender and receiver should be done very carefully to avoid unauthorized interception of such (CK). Because (CK) is shared between both the encryptor and the decryptor, (CK) is preferably communicated before any encrypted messages are transmitted.

Several symmetric key generation algorithms are well known in the art. In a preferred embodiment, the Data Encryption Standard (DES) is employed, though it should be understood that any symmetric algorithm could be used. Examples of such symmetric key algorithms include, without limitation, Triple-DES, the International Data Encryption Algorithm (IDEA), Cast, Cast-128, RC4, RC5, and SkipJack.

At step 404, the application 302 encrypts the digital content with the symmetric content key (CK) to form encrypted digital content 304, which may be written using the notation (CK(content)). The author using the application 302 can also generate rights data associated with the digital content. The rights data can include a list of entities that will be entitled to consume the content, and the specific rights that each of the entities possesses with respect to the content, along with any conditions that may be imposed on those rights. Such rights can for example include viewing the content, printing the content, etc. The application 302 provides the rights data to the API 306. An example of rights data in XML/XrML format is attached hereto as Appendix 1.

At step 406, the API 306 generates a second encryption key (DES1), which is used to encrypt the content key (CK). Preferably, (DES1) is also a symmetric key. At step 408, the API 306 encrypts (CK) with (DES1) to result in (DES1 (CK)). At step 410, the API 306 discards (CK), with the result being that (CK) can now be obtained only by decrypting (DES1(CK)). To ensure that (CK(content)) is protected to a central DRM server 320 and that all "license requests" for the content are done centrally in accordance with the rights data, the API 306, at step 412, contacts the provided DRM server 320 and retrieves the public key (PU-DRM) thereof. At step 414, the API 306 encrypts (DES1) with (PU-DRM) to result in (PU-DRM (DES1)). Thus, (CK) can be protected to (PU-DRM)) to ensure that the DRM server 320 is the only entity that will be able to get access to (CK), as is required to decrypt (CK(content)). At step 416, the API 306 encrypts the rights data (i.e., the list of authorized entities and the respective rights and conditions associated with each authorized entities in the list) with (DES1) to result in (DES1(rightsdata)).

In an alternative embodiment, (CK) can be used to directly encrypt the rights data to result in (CK(rightsdata)), and thereby forego the use of (DES1) completely. However, using (DES1) to encrypt the rights data allows such (DES1) to conform to any particular algorithm that might be amenable to the DRM server, whereas (CK) might be specified by an entity independent from the DRM server and might not be as amenable thereto.

At step 418, the content protection application 302 can submit (PU-DRM(DES1)) and (DES1(rightsdata)) to the DRM server 320 as a rights label for signing. Alternatively, the client itself can sign the rights data. If the rights data is being submitted to the server for signing, then, at step 420, the DRM server 320 accesses the rights data and verifies that it can enforce the rights and conditions in the submitted rights label. To verify that it can enforce the rights data, the DRM server 320 applies (PR-DRM) to (PU-DRM(DES1)) to result in (DES1), and then applies (DES1) to (DES1 (rightsdata)) to result in the rights data in the clear. The server 320 can then do any policy checks to verify that the users, rights, and conditions specified in the rights data are within any policy enforced by the server 320. The server 320 signs the originally submitted rights label including (PU-DRM(DES1)) and (DES1(rightsdata)) to result in the signed rights label (SRL) 308, where the signature is based on the private key of the DRM server 320 (PR-DRM), and returns the SRL 308 back to the API 306, which then presents the returned SRL 308 to the client application 302 .

The SRL 308 is a digitally signed document, which makes it tamper-resistant. Additionally, the SRL 308 is independent of the actual key type and algorithm used to encrypt the content but maintains the strong 1-1 relation to the content it is protecting. Referring now to FIG. 4A, in one embodiment of the present invention, the SRL 308 may include information on the content that is the basis of the SRL 308, including perhaps an ID of the content; information on the DRM server that signs the SRL 308, including (PU-DRM (DES1)) and referral information such as a URL for locating the DRM server on a network and fall-back information if the URL fails; information describing the SRL 308 itself; (DES1(rightsdata)): (DES1(CK)); and S (PR-DRM), among other things. A sample SRL 308 in XML/XrML is attached hereto as Appendix 2.

By ensuring that a trusted entity signs the rights data to create a signed rights label 308, the DRM server is asserting that it will issue licenses for the content in accordance with the terms set forth by the publisher as described in the rights data of the signed rights label 308. As should be appreciated, a user is required to obtain a license to render the content, especially inasmuch as the license contains the content key (CK). When a user wants to obtain a license for the encrypted content, the user can present a license request including the SRL 308 for the content and a certificate verifying the user's credentials to the DRM server 320 or other license issuing entity. The license issuing entity can then decrypt (PU-DRM(DES1)) and (DES1 (rightsdata)) to produce the rights data, list all the rights granted by the author (if any) to the license requesting entity, and construct a license with only those specific rights.

Preferably, upon the application 302 receiving the SRL 308, such application 302 concatenates the signed rights label 308 with the corresponding (CK(content)) 304 to form rights managed digital content. Alternatively, the rights data can be stored in a known location, with a reference to that location provided with the encrypted digital content. Thus, a rendering application that is DRM-enabled can discover the signed rights label 308 via the piece of content the rendering application is attempting to render. This discovery triggers the rendering application to initiate a license request against the DRM licensing server 320. Publishing application 302 can store a URL to the DRM licensing server 320, for example, or the DRM licensing server 320 can embed its own URL as a piece of metadata into the rights label before digitally signing it, so that the DRM client API 306 called by the rendering application can identify the correct DRM licensing server 320. Preferably, a unique identifier, such as a globally unique identifier (GUID), for example, is put into the rights label before it is signed.

In a preferred embodiment of the invention, simple object access protocol (SOAP) can be used for communication between the content protection application 302 or the rendering application and the DRM server 320. Additionally, API libraries, such as API 306, can be provided so that applications, such as application 302, are not required to implement the client side of the DRM protocol, but rather can just make local API calls. Preferably, XrML, an XML language, is used for describing rights descriptions, licenses, and rights labels for digital content, though it should be understood that any suitable format can be uses for the rights description and other data.

Obtaining a License for the Published Content

Figure 5:
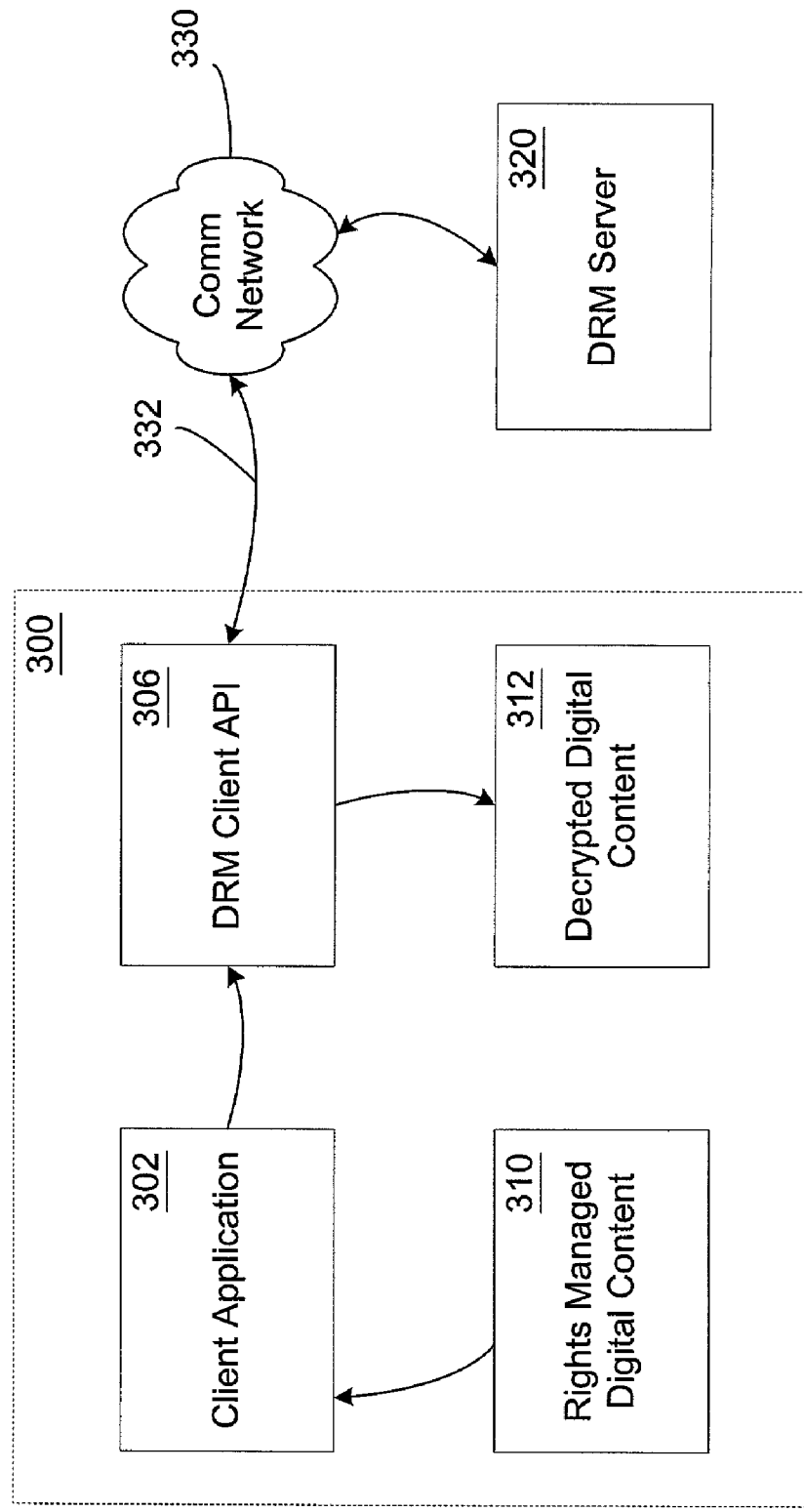
FIG. 5 is a functional block diagram of a preferred embodiment of a system and method according to the invention for licensing rights managed digital content.

FIG. 5 is a functional block diagram of a preferred embodiment of a system and method according to the invention for licensing rights managed digital content. "Licensing," as that term is used herein, refers to a process that an application or service follows to request and receive a license that will enable an entity named in the license to consume the content in accordance with the terms specified in the license. Inputs to the licensing process can include the signed rights label (SRL) 308 associated with the content for which a license is being requested, and the public key certificate(s) of the entity(s) for which the license is being requested. Note that the entity requesting a license need not necessarily be the entity for which the license is being requested. Typically, a license includes the rights description from the SRL 308 an encrypted key that can decrypt the encrypted content, and a digital signature over the rights description and the encrypted key. The digital signature asserts that the entities and rights named are legitimate.

One way for the application 302 to consume the rights managed content 310 is for the client API 306 to forward the signed rights label 308 of the rights managed content 310 to the DRM server 320 via the communication network 330. The location of the DRM server 320 can be found, for example, in the referral information in the SRL 308. In such an embodiment, the DRM licensing server 320, via a process that is described in detail below, can use the rights description in the rights label to determine whether it can issue a license and, if so, to derive the rights description to include with the license. As described above, the rights signed label 308 contains the content key (CK) encrypted according to the public key of the DRM server 320 (PU-DRM) (i.e., (PU-DRM(CK))). In the process of issuing a license, the DRM server 320 securely decrypts this value to obtain (CK). It then uses the public key (PU-ENTITY) in the public key certificate that is passed up in the license request to re-encrypt (CK) (i.e., (PU-ENTITY(CK))). The newly encrypted (PU-ENTITY(CK)) is what the server 320 places into the license. Thus, the license can be returned to the caller without risk of exposing (CK), since only the holder of the associated private key (PR-ENTITY) can recover (CK) from (PU-ENTITY(CK)). The client API 306 then uses (CK) to decrypt the encrypted content to form decrypted digital content 312. The client application 302 can then use the decrypted digital content 312 according to the rights that are provided in the license.

One way for the application 302 to consume the rights managed content 310 is for the client API 306 to forward the signed rights label 308 of the rights managed content 310 to the DRM server 320 via the communication network 330. The location of the DRM server 320 can be found, for example, in the referral information in the SRL 308. In such an embodiment, the DRM licensing server 320, via a process that is described in detail below, can use the rights description in the rights label to determine whether it can issue a license and, if so, to derive the rights description to include with the license. As described above, the rights label 308 contains the content key (CK) encrypted according to the public key of the DRM server 320 (PU-DRM) (i.e., (PU-DRM(CK))). In the process of issuing a license, the DRM server 320 securely decrypts this value to obtain (CK). It then uses the public key (PU-ENTITY) in the public key certificate that is passed up in the license request to re-encrypt (CK) (i.e., (PU-ENTITY(CK))). The newly encrypted (PU-ENTITY(CK)) is what the server 320 places into the license. Thus, the license can be returned to the caller without risk of exposing (CK), since only the holder of the associated private key (PR-ENTITY) can recover (CK) from (PU-ENTITY(CK)). The client API 306 then uses (CK) to decrypt the encrypted content to form decrypted digital content 312. The client application 302 can then use the decrypted digital content 312 according to the rights that are provided in the license.

Alternatively, a client, such as the publishing client, for example, can issue its own license to consume the content. In such an embodiment, a secured process can be run on the client computer that provides the client with the key(s) necessary to decrypt the digital content under appropriate circumstances.

Figure 6A:
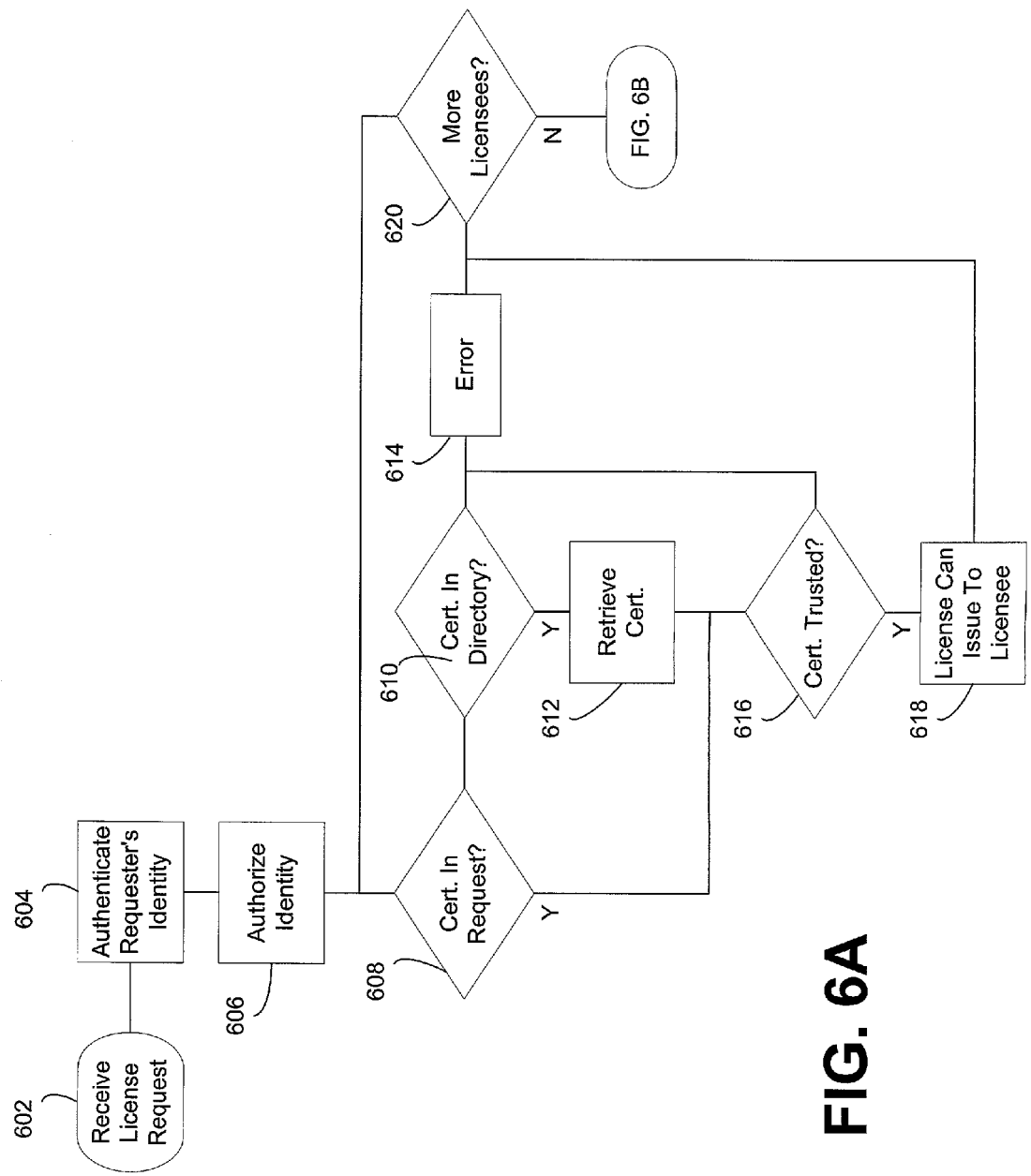
FIGS. 6A and 6B provide a flowchart of a preferred embodiment of a method according to the invention for licensing rights managed digital content.
Figure 6B:
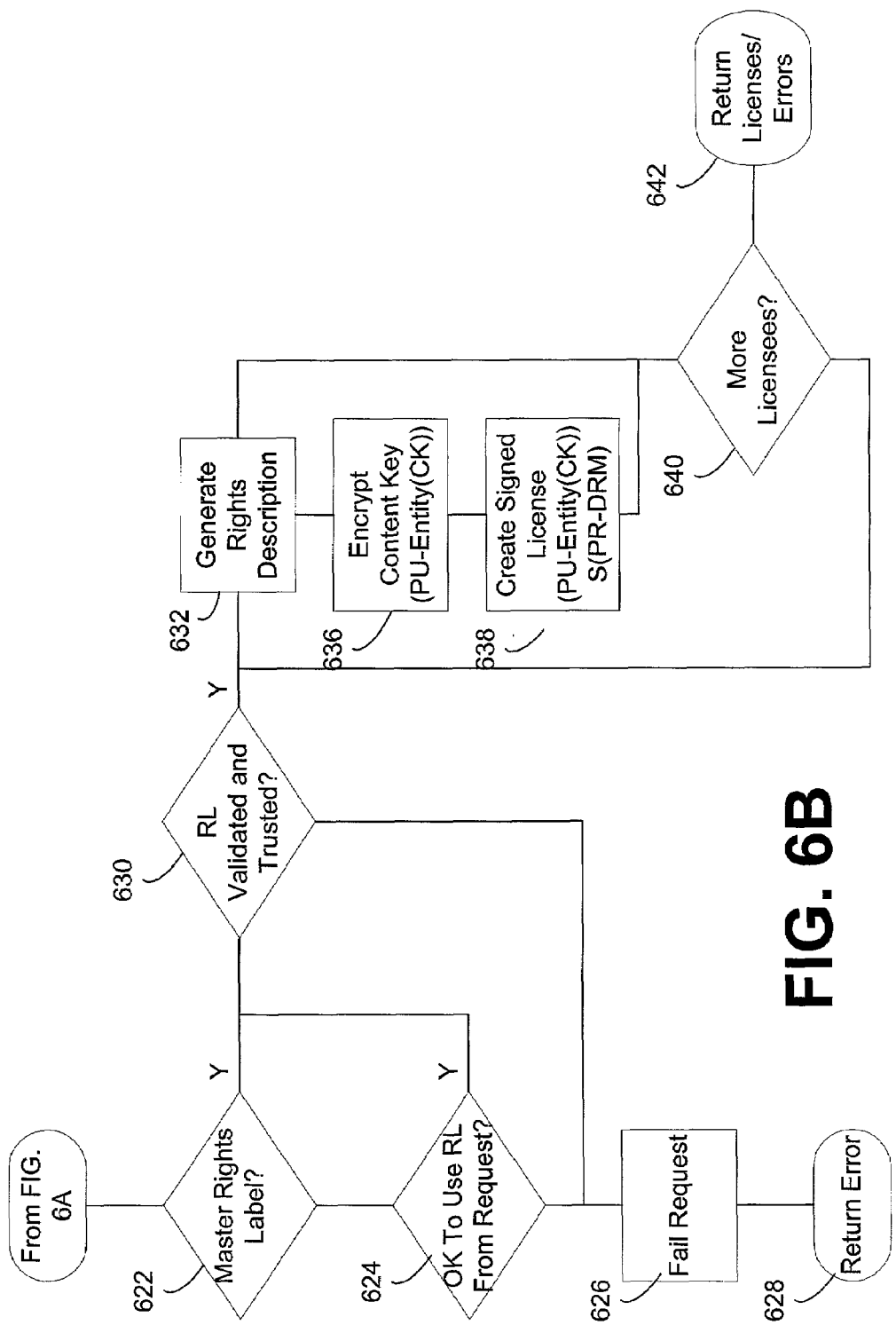

FIGS. 6A and 6B provide a flowchart of a preferred embodiment of a method 600 according to the invention for licensing rights managed digital content. According to the invention, a requesting entity can submit a license request on behalf of one or more potential licensee. The requesting entity may or may not be one of the potential licensees. A potential licensee can be a person, a group, a device, or any other such entity that can consume the content in any fashion. The method 600 will now be described with reference to an embodiment wherein a DRM server processes the license request, though it should be understood that license request processing could also be performed on, and licenses issued directly by, the client.

At step 602, a license issuing entity, such as a DRM server, for example, receives a license request. Preferably, a license request includes either a public key certificate or an identity for each of one or more requested licensees. The SOAP protocol for a preferred embodiment of a license request is:

```
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
    <soap:Body>
        <AcquireLicense xmlns="http://xxxx.com/PublishingService">
            <RequestParams>
                <AcquireLicenseParams>
                    <LicenseeCerts>
                        <String>string</String>
                        <String>string</String>
                    </LicenseeCerts>
                    <RightsSpecification>string</
                    RightsSpecification>
                    <RightsOfferID>string</RightsOfferID>
                    <ApplicationData>string</ApplicationData>
                </AcquireLicenseParams>
                <AcquireLicenseParams>
                    . . .
                </AcquireLicenseParams>
            </RequestParams>
        </AcquireLicense>
    </soap:Body>
</soap:Envelope>
```

At step 604, the requesting entity (i.e., the entity making the license request) is authenticated. According to one embodiment of the invention, the license issuing entity can be configured to use protocol (e.g., challenge-response) authentication to determine the identity of the requesting entity, or it can be configured to not require authentication of the requesting entity (also known as "allowing anonymous authentication"). Where authentication is required, any type of authentication scheme may be used (e.g., the challenge-response scheme mentioned above, a user-id-and-password scheme such as MICROSOFT.NET, PASSPORT, WINDOWS authorization, x509, etc.). Preferably, anonymous authentication is allowed, as well as supporting any protocol authentication scheme supported by integrated information systems. The result of the authentication step will be an identity, such as an "anonymous" identity (for anonymous authentication), or a personal account identity, for example. If the license request cannot be authenticated for any reason, an error is returned and no license is granted.

At step 606, the authenticated entity is authorized—i.e., it is determined whether the entity authenticated at step 608 is allowed to request a license (either for itself or on behalf of another entity). Preferably, the license issuing entity stores a list of entities that are allowed (or not allowed) to request a license. In a preferred embodiment, an identity in this list of identities is the identity of the entity making the request, rather then the identity of the entity for whom a license is being requested, though it could be either. For example, a personal account identity may not be allowed to directly make a license request, but a trusted server process may make a license request on behalf of such an entity.

According to the invention, the license request can include either a public key certificate or an identity for each potential licensee. If a license is requested for only one licensee, only one certificate or identity is named. If a license is requested for a plurality of licensees, a certificate or an identity can be named for each potential licensee.

Preferably, the license issuing entity has a public key certificate for each valid licensee. However, an application 302 may want to generate a license for a given user, but the application 302 might not have access to the public key certificate for that user. In such a situation, the application 302 can specify the identity of the user in the license request and, as a result, the license issuing entity can invoke a registered certificate plug-in module that performs a lookup in a directory service and returns the appropriate user's public key certificate.

If, at step 608, the issuing entity determines that the public key certificate is not included in the license request, then the issuing entity uses the specified identity to perform a lookup in a directory service or database for the appropriate public key certificate. If, at step 610, the issuing entity determines that the certificate is in the directory, then, at step 612, the certificate is retrieved. In a preferred embodiment, a certificate plug-in is used to retrieve public key certificates from a directory service over by way of a directory access protocol. If a certificate cannot be found for a given potential licensee, either in the request or in the directory, then the license server does not generate a license for that potential licensee and, at step 614, an error is returned to the requesting entity.

Assuming the license issuing entity has a public key certificate for at least one potential licensee, then, at step 616, the issuing entity validates the trust of the licensee certificates. Preferably, the issuing entity is configured with a set of trusted certificate issuer certificates, and it determines whether the issuer of the licensee certificate is in the list of trusted issuers. If, at step 616, the issuing entity determines that the issuer of the licensee certificate is not in the list of trusted issuers, then the request fails for that licensee, and an error is generated at step 614. Thus, any potential licensee whose certificate is not issued by a trusted issuer would not receive a license.

Additionally, the issuing entity preferably performs digital signature validation on all entities in the certificate chain going from the trusted issuer certificates to the individual licensee public key certificates. The process of validating the digital signatures in a chain is a well-known algorithm. If the public key certificate for a given potential licensee does not validate, or a certificate in the chain does not validate, the potential licensee is not trusted, and a license, therefore, is not issued to that potential licensee. Otherwise, at step 618, a license can issue. The process repeats at step 620 until all entities for which a license has been requested have been processed.

As shown in FIG. 6B, the license issuing entity proceeds to validate the signed rights label 308 that is received in the license request. In a preferred embodiment, the issuing entity can use a rights label plug-in, and a back-end database to store on the server a master copy of every rights label signed by the issuing entity. The rights labels are identified by the GUID placed into them at publication. At license time (at step 622), the issuing entity parses the rights label input in the license request and retrieves its GUID. It then passes this GUID to the rights label plug-in, which issues a query against the database to retrieve a copy of the master rights label. The master rights label could be more up to date than the copy of the rights label sent in the license request, and it will be the rights label used in the request in the steps below. If no rights label is found in the database based upon the GUID, the issuing entity checks its policy, at step 624, to determine whether it is still allowed to issue a license based on the rights label in the request. If the policy does not allow this, the license request will fail at step 626, and an error will be returned to the API 306 at step 628.

At step 630, the license issuing entity validates the rights label. The digital signature on the rights label is validated and, if the license issuing entity is not the issuer of the rights label (the entity that signed it), then the license issuing entity determines whether the issuer of the rights label is another trusted entity (e.g., an entity with which the license issuing entity is enabled to share key material). If the rights label does not validate, or it is not issued by a trusted entity, then the license request fails at step 626, and an error will be returned to the API 306 at step 628.

After all the validations have occurred, the license issuing entity translates the rights label into a license for each of the approved licensees. At step 632, the license issuing entity generates a respective rights description for the license to be issued to each licensee. For each licensee, the issuing entity evaluates the identity named in the public key certificate of that licensee against the identities named in the rights description in the rights label. The rights description assigns to every right or set of rights, a set of identities that can exercise that right or set of rights in a license. For every right or set of rights to which this licensee's identity is associated, that right or set of rights is copied into a new data structure for the license. The resulting data structure is the rights description in the license for the particular licensee. As part of this process, the license issuing entity evaluates any preconditions that might be associated with any of the rights or sets of rights in the rights description of the rights label. For example, a right may have a time precondition associated with it that limits the license issuing entity from issuing a license after a specified time. In this case the issuing entity would need to check the current time and, if it is past the time specified in the precondition, then the issuing entity would not be able to issue that right to the licensee even if that licensee's identity were associated with that right.

At step 636, the issuing entity takes (PU-DRM(DES1)) and (DES1 (CK)) from the rights label and applies (PR-DRM) to obtain (CK). The issuing entity then re-encrypts (CK) using (PU-ENTITY) the licensee's public key certificate to result in (PU-ENTITY(CK)). At step 638, the issuing entity concatenates the generated rights description with (PU-ENTITY(CK)) and digitally signs the resulting data structure using (PR-DRM). This signed data structure is the license for this particular licensee.

When, at step 640, the issuing entity determines that there are no more licenses to generate for the particular request, it will have generated zero or more licenses. The generated licenses are returned to the requesting entity, at step 642, along with the certificate chain associated with those licenses (e.g., the server's own public key certificate as well as the certificate that issued its certificate and so on).

The SOAP protocol for a preferred embodiment of a license response is as follows:

```
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <AcquireLicenseResponse xmlns="http://xxxx.com/
        LicensingService">
            <AcquireLicenseResult>
                <AcquireLicenseResponse>
                    <CertificateChain>
                        <String>string</String>
                        <String>string</String>
                    </CertificateChain>
                </AcquireLicenseResponse>
                <AcquireLicenseResponse>
                    ...
                </AcquireLicenseResponse>
                ...
            </AcquireLicenseResult>
        </AcquireLicenseResponse>
```

-continued

```
    </soap:Body>
</soap:Envelope>
```

In a preferred embodiment of a system according to the invention, a plurality of licensor keys can be used. In such an embodiment, the content key (CK) that travels encrypted through the rights label and into the license can actually be any arbitrary data. One particularly useful variation is to use a plurality of separate, encrypted, content keys (CK) associated, respectively, with different rights or different principals in the rights description. For example, the digital version of songs on an album could all be encrypted with different keys (CK). These keys (CK) would be included in the same rights label, but one principal may have the right to play one of the songs (e.g., he might only have rights to get the one key in his license), while a second principal might have rights to play all the songs (she would have rights to get all keys in her license).

Preferably, a system according to the invention enables publishing applications/users to name groups or classes of licensees in a rights label. In such an embodiment, the license issuing entity will evaluate any groups/classes named in the rights label to determine if the current licensee identity is a member of those groups classes. If membership in a named group/class is found, the issuing entity could add the rights or set of rights associated with the group/class to the rights description data structure used for the license.

In a preferred embodiment of the invention, the publish and license protocol interfaces in the DRM server support authentication and authorization of the calling application or user, and the administrative console for the DRM server allows an administrator to generate an access control list for both the licensing and publishing interfaces. This enables the customer of the server to apply policy over which users/applications are allowed to either publish, license, or both.

Modifying or Republishing the Signed Rights Label 308

In one embodiment of the present invention, the SRL 308 can be "republished" if the user of the content has been granted sufficient permission to do so. That is, if allowed, the user may alter rights data within the SRL 308. Notably, such permission to alter the rights data should be granted sparingly and judiciously, especially inasmuch as a user with permission to alter the rights data can essentially grant itself broad rights with regard to the associated content. Conceivably, such a user could even grant itself the right to expose the content and forward same to the world.

Here, permission to alter is signified by including within the rights data in the SRL 308 an indication that a particular user or class of users can in fact alter or 'republish' the rights data and rights label. When the DRM sewer 320 receives such an SRL 308 with such permission in connection with a request for a license, the DRM sewer 320 includes within the requested license for the user the symmetric key (DES1) encrypted according to the public key of the user (i.e., PU-ENTITY) to result in (PU-ENTITY(DES1)).

Figure 7:
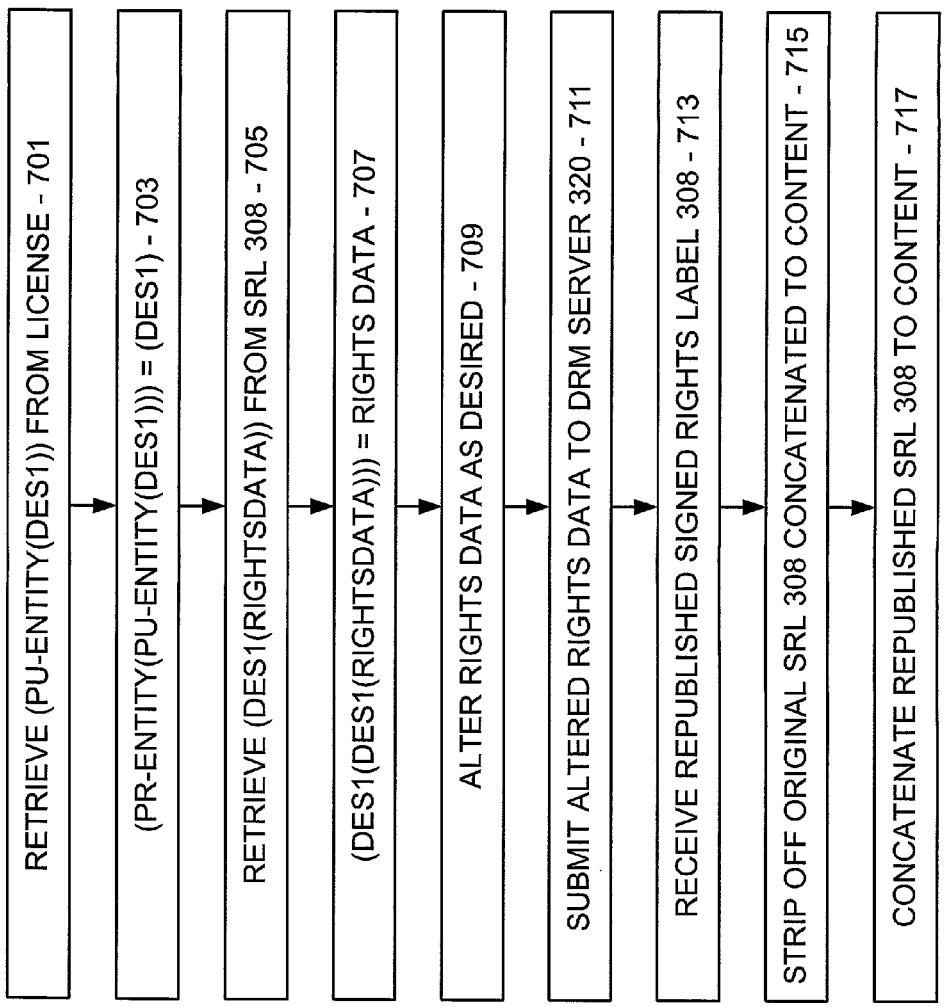
FIG. 7 is a flow chart showing key steps performed in re-publishing a rights label in accordance with one embodiment of the present invention.

Thus, to edit the rights data within the SRL 308, and turning now to FIG. 7, the user retrieves (PU-ENTITY (DES1)) from the license (step 701), applies (PR-ENTITY) thereto to result in (DES1) (step 703), retrieves (DES1 (rightsdata)) from the SRL 308 (step 705), and applies (DES1) thereto to result in the rights data (step 707). Thereafter, the user alters the rights data as desired (step 709), and submits the altered rights data to the DRM server 320 in the manner set forth in connection with FIG. 4 to obtain a signed rights label 308 (step 711). Of course, here, the signed rights label 308 is actually a republished SRL 308, and accordingly once the SRL 308 is received (step 713), the user strips off the original SRL 308 concatenated to the associated content (step 715) and then concatenates the republished SRL 308 to such content (step 717).

Thus, and as may be appreciated, republishing an SRL 308 enables a user to update the rights data in the SRL 308, including rights, conditions, and users, without having to alter the associated content. In particular, republishing does not require re-encrypting the associated content with a new (CK). Also, republishing does not require generating a new SRL from scratch, especially inasmuch as the original SRL 308 has many items therein that can be copied to the new SRL 308.

Self-Publishing the Signed Rights Label 308

In one embodiment of the present invention, the SRL 308 may be signed by the requesting user itself. Accordingly, the user need not contact the DRM server 320 to obtain an SRL 308 for an associated piece of content. As a result, self-publishing may also be referred to as off-line publishing. In such embodiment, a user may be required to contact a DRM server 320 to request a license based on such a self-published SRL 308. It should also be understood that a publishing entity may be enabled to issue its own licenses.

Figure 8:
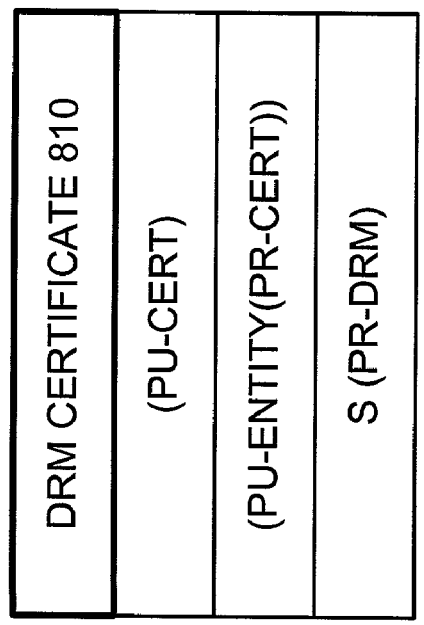
FIG. 8 is a block diagram showing a certificate issued by a DRM server to a user to allow the user to perform off-line publishing in accordance with one embodiment of the present invention.

In particular, and referring now to FIG. 8, in the embodiment, a user is first provisioned to self-publish by receiving from a DRM server 320 a DRM certificate 810 including a public key (PU-CERT) and a corresponding private key (PR-CERT) encrypted according to the public key of the user (PU-ENTITY) to result in (PU-ENTITY(PR-CERT)). The certificate should be signed by the private key of the DRM server 320 (PR-DRM) so that such DRM server 320 can verify same, as will be discussed in more detail below. As may be appreciated, the DRM certificate 810 authorizes the user to self-publish. As may also be appreciated, the key pair (PU-CERT, PR-CERT) are separate from (PU-ENTITY, PR-ENTITY), and are employed specifically for self-publishing. Note that the key pair (PU-CERT, PR-CERT) may be dispensed with, in which case the DRM certificate 810 includes only the public key of the user (PU-ENTITY) and is signed by the private key of the DRM server 320 (PR-DRM) so that such DRM server 320 can verify same.

Self-publishing differs from publishing as shown in FIG. 4 in that the user essentially takes the place of the DRM server 320 with regard to steps performed thereby.

Significantly, the user signs the submitted rights label including (PU-DRM(DES1)) and (DES1(rightsdata)) with (PR-CERT) as obtained from the DRM certificate 810 (i.e., S (PR-CERT)) to result in the signed rights label (SRL) 308. As should be appreciated, the user obtains (PR-CERT) from the DRM certificate 810 by obtaining (PU-ENTITY(PR-CERT)) from such DRM certificate 810 and applying (PR-ENTITY) thereto. Note, though, that the user cannot verify that the DRM server 320 can enforce the rights in the submitted rights label, especially inasmuch as the user does not have (PR-DRM) to apply to (PU-DRM(DES1)). Accordingly, the DRM server 320 itself should perform the verification at the time a license is requested based on the self-published SRL 308.

Once the user self-publishes the SRL 308, the user concatenates such self-published SRL 308 and the DRM certificate 810 employed to produce same to the content, and such content with SRL 308 and DRM certificate 810 is distributed to another user. Thereafter, the other user requests and obtains a license for the content from the DRM server 320 in substantially the same manner as shown in FIGS. 6A and 6B. Here, though, the license-requesting user submits to the DRM server 320 both the self-published SRL 308 and the DRM certificate 810 as concatenated to the content. The DRM server 320 then verifies S (PR-DRM) in the DRM certificate 810 based on the corresponding (PU-DRM), and obtains (PU-CERT) from the DRM certificate 810. The DRM server 320 then verifies S (PR-CERT) in the SRL 308 based on the obtained (PU-CERT), and continues as before. Note, though, that since the user did not verify that the DRM server 320 can enforce the rights in the SRL 308, and as was set forth above, the DRM server 320 itself should perform the verification at this time.

Rights Template

As set forth above, a user is provided with the freedom to create most any variety or sort of rights data in a rights label by defining users or classes of users, defining rights for each defined user or class of users, and then defining any use conditions. However, and significantly, it may be cumbersome and repetitive to repeatedly define the rights data for multiple rights labels, especially when the same users or classes of users, rights, and conditions are repeatedly defined for different pieces of content. Such a situation can for example occur in a corporate or office environment, where a user is repeatedly publishing different pieces of content that are to be shared with a particular defined team of users. In such a situation, then, and in one embodiment of the present invention, a rights template is created that the user can repeatedly employ in connection with creating rights labels, where the rights template already includes therein a pre-defined set of users or classes of users, pre-defined rights for each defined user or class of users, and pre-defined use conditions.

Figure 9:
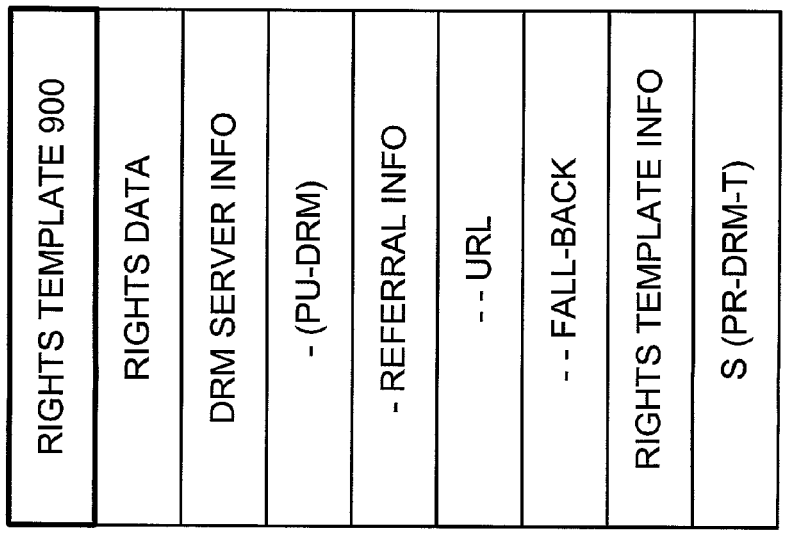
FIG. 9 is a block diagram showing a rights template specifying information to be incorporated into a rights label in accordance with one embodiment of the present invention.

In one embodiment of the present invention, and turning now to FIG. 9, a rights template 900 has substantially the same rights data as would be in a rights label. However, since (DES1) is not known until content is published, the rights data cannot be encrypted according to such (DES1), as is the case in a rights label. In one embodiment of the present invention, then, the rights template 900 with the unencrypted rights data is submitted in the course of encrypting the rights data with (DES1) at step 416 of FIG. 4 to produce (DES1(rightsdata)). Of course, the rights data is retrieved from the submitted rights template 900 prior to being so encrypted.

It may or may not be the case that the DRM server 320 and the public key (PU-DRM) thereof are known at the time the rights template is constructed. Further, even if known, it may or may not be the case that there are more than one DRM servers 320, each having its own (PU-DRM). Nevertheless, in the case where the DRM server 320 and the public key (PU-DRM) thereof are known at the time the rights template is constructed, and in the case where only one DRM server 320 is employed, or only one DRM server 320 is to be employed in connection with the rights template 900, such rights template may also include therein information on the DRM server that is to sign a rights label resulting from the rights template 900, including the public key (PU-DRM) thereof. Although such (PU-DRM) appears in the SRL 308 as encrypting (DES1) to result in (PU-DRM(DES1)), it is again to be appreciated that (DES1) is not known until content is published, and therefore (PU-DRM) in the rights template 900 cannot encrypt such (DES1), as is the case in a rights label. In one embodiment of the present invention, then, the rights template 900 with the unencrypted (PU- DRM) is submitted in the course of encrypting (DES1) with (PU-DRM) at step 414 of FIG. 4 to produce (PU-DRM (DES1)). Of course, (PU-DRM) is retrieved from the submitted rights template 900 prior to being employed.

Also in the aforementioned case, other information on the DRM server that may be included in the rights template may also include referral information such as a URL for locating the DRM server on a network, and fall-back information if the URL fails. In any case, the rights template may also include information describing the rights template 900 itself, among other things. Note that the rights template 900 may also provide space for information relevant to the content that is to be published, such as information that appears in a rights label relevant to the content and/or the encrypting keys (CK) and (DES1), although such space is not necessary if an instantiation of the rights template is not actually transformed into a right label.

Although the rights template 900 as thus far disclosed is primarily for the convenience of a user, it is also to be appreciated that in some circumstances, a user should not have unrestricted freedom to define rights data in a rights label, and a rights template 900 may be used to limit the scope or type of rights labels that can be created. For example, and especially in the case of a corporate or office environment, it may be pre-defined as policy that a particular user should always publish content to a particular class of users only, or that the user should never publish content to a particular class of user. In any case, and in one embodiment of the present invention, such policy is embodied as pre-defined rights data in one or more rights templates 900, and the user may be restricted to employing such rights templates to create rights labels when publishing content. Notably, a rights template or a group of rights templates made available to a user to specify publishing policy for the user may specify any particular type of publishing policy without departing from the spirit and scope of the present invention.

Figure 10:
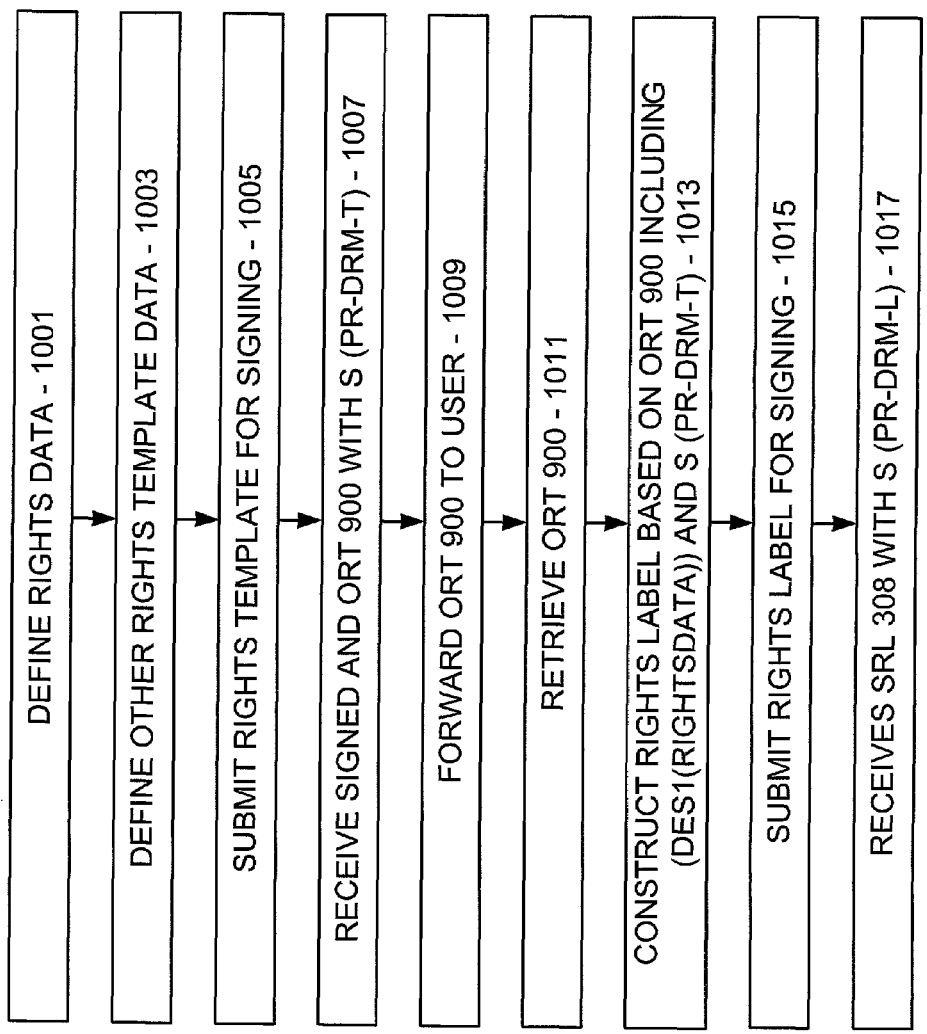
FIG. 10 is a flow chart showing key steps performed in creating the rights template of FIG. 9 and creating the signed rights label of FIG. 4A based on the rights template in accordance with one embodiment of the present invention.

To specify a rights template 900 for a restricted user or the like, and turning now to FIG. 10, an administrator or the like in fact constructs the rights template 900 by defining the pre-defined rights data (step 1001), and defining any other data that may be necessary and appropriate, such as information relevant to a particular DRM server 320 (step 1003). Significantly, to effectuate the rights template for use by the restricted user or the like, the rights template 900 must be made official. That is, the rights template 900 must be recognizable as a rights template that the restricted user or the like may employ. Accordingly, in one embodiment of the present invention, the rights template as constructed by the administrator or the like is submitted to the DRM server 320 for signing thereby, where such signing makes the rights template official (step 1005).

Note that the signing DRM server 320 is the DRM server 320 whose information is in the rights template 900, if indeed such information is in fact present in the rights template 900. Note, also, that the DRM server 320 may sign the rights template 900 only upon making any necessary checks, or may sign without any checks at all. Note, finally, that the template signature S (PR-DRM-T) (where the -T signifies that the signature is for the ORT 900) from the DRM server should be based at least on the pre-defined rights data in the rights template 900, but may also be based on other information without departing from the spirit and scope of the present invention. As set forth below, the signature S (PR-DRM-T) will be incorporated into a rights label and will be verified in connection therewith, and accordingly whatever the signature is based on should also be incorporated into the rights label in an unaltered form.

Upon the DRM server 320 signing the rights template 900 and returning same to the administrator or the like, the administrator receives the signed and now official rights template 900 with S (PR-DRM-T) (step 1007) and forwards the official rights template (ORT) 900 to one or more users for use thereby (step 1009). Accordingly, for a user to publish content based on an ORT 900, the user retrieves the ORT 900 (step 1011), and constructs a rights label based on the ORT 900 (step 1013) by providing any information necessary, such as information on the content, appropriate key information, the rights data from the ORT 900 encrypted by (DES1) to result in (DES1(rightsdata)), and any other information from the ORT 900. Significantly, the user also includes with the rights label the signature S (PR-DRM-T) from the ORT 900.

Thereafter, and as before, the user submits the rights label to the DRM server 320 for signing (step 1015). Here, though, the DRM server 320 will not sign the submitted rights label unless S (PR-DRM-T) therein verifies. That is, the DRM server 320 enforces that the user must base the submitted rights label on an ORT 900 by refusing to sign the submitted rights label unless such submitted rights label includes a signature S (PR-DRM-T) from an ORT 900. In particular, the DRM server 320 retrieves such S (PR-DRM-T) and whatever information such signature is based on from the submitted rights label and then verifies such signature based on (PU-DRM). Note that the rights data in the submitted rights label is encrypted according to (DES1) (i.e., (DES1(rightsdata)) Accordingly the DRM server 320 must first obtain (DES1) and decrypt (DES1(rightsdata)) therewith, as set forth above in connection with FIG. 7 to be able to verify the signature based on the rights data in the submitted rights label.

Once verified, the DRM server 320 signs the submitted rights label with S (PR-DRM-L) to produce an SRL 308, as before (where the -L signifies that the signature is for the SRL 308). Here, S (PR-DRM-L) may replace S (PR-DRM-T), or may be in addition to such S (PR-DRM-T). If in addition, S (PR-DRM-L) may be based in part on S (PR-DRM-T). Note that (PR-DRM) may be employed to produce both S (PR-DRM-T) and S (PR-DRM-L), or that different (PR-DRM)s may be employed for each of S (PR-DRM-T) and S (PR-DRM-L). Upon the DRM server 320 signing the rights label and returning the SRL 308 to the user, the user receives the SRL 308 with S (PR-DRM-L) (step 1017) and proceeds to concatenate same to the content being published, as before.

If the signature S (PR-DRM-T) of the ORT 900 is based at least in part on the pre-defined rights data in the ORT 900, then such rights data as it appears in the SRL 308 (in DES1(rightsdata)) cannot be modified or varied. Otherwise, S (PR-DRM-T) will not verify. Nevertheless, in one embodiment of the present invention, the rights data in the ORT 900 can vary within prescribed rules that are also included with the ORT 900. For example, the rules may specify one of two sets of rights data to be included in an SRL 308, or may allow a selection from among a set of alternatives. As may be appreciated, the rules may be any particular rules set forth in any appropriate syntax without departing from the spirit and scope of the present invention. Here, the rules are interpreted by an appropriate rule interpreter for the user at the time the rights label is created. Although the rights data may vary, the rules do not likewise vary, and accordingly the template signature S (PR-DRM-T) for the ORT 900 is based at least in part on the rules and not on the rights data itself.

As a result, the rules included with the ORT 900 must also be included with the SRL 308.

In one embodiment of the present invention, the pre-defined rights data in the ORT 900 is fixed and invariant in part and is variable and rule-driven in part, as set forth above. Here, the template signature S (PR-DRM-T) for the ORT 900 is based at least in part on the fixed part of the rules and on the rules for the variable part of the rights data.

As may be appreciated, an ORT 900 as possessed by a user may become dated or stale. That is, the ORT 900 through the rights data therein may reflect policy that has become out-of-date, irrelevant, or simply not applicable anymore. For example, one or more users or classes of users specified in the rights data of the ORT 900 may no longer exist within the policy environment, or a particular user or class of users specified in the rights data of the ORT 900 may no longer have the same rights within the policy environment. In such case, it may be that the administrator has issued a revised ORT 900 but that the user is still using a previous, stale version of the ORT 900.

In such a situation, then, and in one embodiment of the present invention, the DRM server 320 upon signing a submitted rights template 900 to create an ORT 900 retains a copy of the ORT 900, each ORT 900 has a unique identifying indicia, and each rights label constructed based on an ORT 900 includes the identifying indicia of such ORT 900 therein. Accordingly, upon receiving a submitted rights label such as in connection with FIG. 10, the DRM server 320 finds the identifying indicia of the ORT 900 in the rights label, retrieves the most up-to-date copy of such ORT 900 based on the found identifying indicia, removes the rights data from the submitted rights label, inserts the rights data from the retrieved ORT 900, and then signs the rights label based at least in part on the inserted rights data. Of course, the DRM server also performs any necessary encryption and decryption steps necessary and incumbent in the process as set forth, including decrypting and re-encrypting (DES1 (rightsdata)). Note that if the DRM server is adapted to replace the rights data in a submitted rights label, such rights label and the ORT 900 from which such rights label is constructed need not necessarily include the rights data therein. Instead, the rights data need only be resident at the DRM server 320. However, including the rights data with the rights label and the ORT 900 from which such rights label is constructed could be useful for the user, and therefore may be useful in some situations.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

Thus, there have been described systems and methods for issuing usage licenses for digital content and services via a signed rights label. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

APPENDIX 1

Sample Rights Data

```
<?xml version="1.0" ?>
<XrML version="1.2">
  <BODY type="Rights Template">
    <DESCRIPTOR>
      <OBJECT>
        <ID type="GUID">c43 . . . </ID>
        <NAME>$$411$411name$411desc</NAME>
      </OBJECT>
    </DESCRIPTOR>
    <WORK>
      <OBJECT>
        <ID />
      </OBJECT>
      <RIGHTSGROUP name="MAIN RIGHTS">
        <RIGHTSLIST>
          <VIEW>
            <CONDITIONLIST>
              <ACCESS>
                <PRINCIPAL>
                  <OBJECT>
                    <ID />
                    <NAME>test@company.com</NAME>
                  </OBJECT>
                </PRINCIPAL>
              </ACCESS>
            </CONDITIONLIST>
          </VIEW>
          <RIGHT name="generic">
            <CONDITIONLIST>
              <ACCESS>
                <PRINCIPAL>
                  <OBJECT>
                    <ID />
                    <NAME>test@company.com</NAME>
                  </OBJECT>
                </PRINCIPAL>
              </ACCESS>
            </CONDITIONLIST>
          </RIGHT>
        </RIGHTSLIST>
      </RIGHTSGROUP>
    </WORK>
  </BODY>
  <SIGNATURE>
    <ALGORITHM>RSA PKCS#1-V1.5</ALGORITHM>
    <DIGEST>
      <ALGORITHM>SHA1</ALGORITHM>
      <PARAMETER name="codingtype">
        <VALUE encoding="string">surface-coding</VALUE>
      </PARAMETER>
      <VALUE encoding="base64" size="160">MwI . . . =</VALUE>
    </DIGEST>
    <VALUE encoding="base64" size="1024">Msi . . . =</VALUE>
  </SIGNATURE>
</XrML>
```

APPENDIX 2

Sample Signed Rights Label (SRL) 308

```
<?xml version="1.0" ?>
<XrML version="1.2">
  <BODY type="Rights Label" version="3.0">
    <ISSUEDTIME>2002-01-01_12:00:00</ISSUEDTIME>
    <DESCRIPTOR>
      <OBJECT>
        <ID />
        <NAME>$$409$ . . . </NAME>
      </OBJECT>
    </DESCRIPTOR>
    <ISSUER>
      <OBJECT type="DRM-Server">
        <ID type="GUID">{d81 . . . }</ID>
        <NAME>Test DRM Server</NAME>
```

APPENDIX 2-continued

Sample Signed Rights Label (SRL) 308

```
        <ADDRESS type="URL">http://licensing.dev.com
        </ADDRESS>
      </OBJECT>
      <PUBLICKEY>
        <ALGORITHM>RSA</ALGORITHM>
        <PARAMETER name="public-exponent">
          <VALUE encoding="integer32">65537</VALUE>
        </PARAMETER>
        <PARAMETER name="modulus">
          <VALUE encoding="base64" size="1024">NcO . . . =
          </VALUE>
        </PARAMETER>
      </PUBLICKEY>
      <ENABLINGBITS type="sealed-key">
        <VALUE encoding="base64" size="1024">tFg . . . =
        </VALUE>
      </ENABLINGBITS>
      <SECURITYLEVEL name="Server-Version" value="2.0" />
      <SECURITYLEVEL name="Server-SKU" value="22222-3333" />
    </ISSUER>
    <DISTRIBUTIONPOINT>
      <OBJECT type="LICENSE ACQUISITION URL">
        <ID type="GUID">{0F4 . . . }</ID>
        <NAME>DRM Server Cluster</NAME>
        <ADDRESS type="URL">http://localhost/Licensing
        </ADDRESS>
      </OBJECT>
    </DISTRIBUTIONPOINT>
    <WORK>
      <OBJECT type="TEST-FORMAT">
        <ID type="MYID">FDB-1</ID>
      </OBJECT>
      <METADATA>
        <SKU type="PIDTYPE">PID</SKU>
      </METADATA>
      <PRECONDITIONLIST>
        <TIME />
      </PRECONDITIONLIST>
    </WORK>
    <AUTHDATA name="Encrypted Rights data">PAB . . .
    </AUTHDATA>
  </BODY>
  <SIGNATURE>
    <ALGORITHM>RSA PKCS#1-V1.5</ALGORITHM>
    <DIGEST>
      <ALGORITHM>SHA1</ALGORITHM>
      <PARAMETER name="codingtype">
        <VALUE encoding="string">surface-coding</VALUE>
      </PARAMETER>
      <VALUE encoding="base64" size="160">Prc . . . =</VALUE>
    </DIGEST>
    <VALUE encoding="base64" size="1024">EHd . . . =</VALUE>
  </SIGNATURE>
</XrML>
```

The invention claimed is:

1. A method of publishing digital content to enable a license server to issue a digital license corresponding to the content to one or more users desiring to render the content, the method comprising:

encrypting the content according to a content key CK to result in CK(content);

protecting the content key CK according to a public key for the license server PU-DRM;

generating rights data associated with the content;

protecting the rights data according to PU-DRM;

submitting the protected rights data and the protected content key CK as a rights label to the license server for signing thereby, the license server validating the rights label and, if valid, creating a digital signature based on a private key PR-DRM corresponding to PU-DRM and based at least in part on the protected rights data to result in a signed rights label SRL and returning the SRL, whereby the license server signs both the rights data and the content key CK that are protected according to PU-DRM;

receiving the returned SRL and concatenating such received SRL with CK(content) to form a content package; and distributing the content package to the one or more users;

receiving from a user a request for the license corresponding to the content, the request comprising the SRL as retrieved from the content package, whereby the license server verifies its own signature of the rights label in the received SRL based on PU-DRM and based at least in part on the protected rights data, accesses the protected rights data in the SRL and reviews same to determine whether the user is entitled to the license, and if so issues the license to the user, the license including CK in a protected form accessible to the user.

2. The method of claim 1 wherein protecting the content key CK according to a public key for the license server PU-DRM comprises:

generating a symmetric key DES1;

encrypting CK according to DES1 to result in DES1(CK); and encrypting DES1 according to PU-DRM to result in PU-DRM(DES1), whereby the license server can access CK with PR-DRM.

3. The method of claim 2 further comprising discarding CK after encrypting CK according to DES1 to result in DES1(CK), whereby CK can only be obtained by decrypting DES1(CK).

4. The method of claim 1 wherein protecting the rights data according to PU-DRM comprises:

generating a symmetric key DES1;

encrypting the rights data according to DES1 to result in DES1(rightsdata);

encrypting DES1 according to PU-DRM to result in PU-DRM(DES1), whereby the license server can access the rights data with PR-DRM.

5. The method of claim 1 comprising encrypting the content according to a symmetric content key CK to result in CK(content).

6. The method of claim 1 comprising generating rights data including each entity entitled to render the content and for each entity each right the entity possesses with respect to rendering the content, each entity comprising one of a user and a class of users.

7. The method of claim 6 comprising generating rights data including for each of at least some of the rights the entity possesses with respect to rendering the content a precondition for exercising the right.

8. The method of claim 1 comprising submitting the protected rights data, the protected content key CK), and information on the content including an identifier thereof as the rights label to the license server for signing thereby.

9. The method of claim 1 wherein the license server adds to the rights label information on the license server including address information for locating the license server and returns the SRL including the information on the server, and wherein the method comprises receiving the returned SRL including the information on the server.

10. A method for providing a digital license from a license server to a user, the license for allowing the user to render corresponding published digital content, the content being encrypted according to a content key CK to result in CK(content), CK(content) being accompanied by a signed rights label SRL, the method comprising:

receiving the SRL and a user key as part of a request for the license from the user, the SRL including a rights label comprising CK protected according to a public key for the license server PU-DRM, rights data protected according to PU-DRM, the SRL also including the license server's digital signature of the rights label based on a private key PR-DRM corresponding to PU-DRM and based at least in part on the protected rights data, whereby the license server signs both the rights data and the content key CK that are protected according to PU-DRM,;

accessing the license server's signature of the rights label in the received SRL;

verifying by the license server its own signature of the received SRL based on PU-DRM and based at least in part on the protected rights data;

accessing the protected rights data in the SRL;

reviewing the accessed rights data to determine whether the user is entitled to the license; and if so:

accessing the protected CK in the SRL;

protecting the accessed CK according to the received user key; and issuing the license to the user, the license including CK protected according to the user key.

11. The method of claim 10 wherein CK protected according to a public key for the license server PU-DRM comprises CK encrypted according to a symmetric key DES1 to result in DES1(CK) and DES1 encrypted according to PU-DRM to result in PU-DRM(DES1), the method comprising accessing the protected CK in the SRL by:

applying PR-DRM to PU-DRM(DES1) to result in DES1;
applying DES1 to DES1(CK) to result in CK.

12. The method of claim 10 wherein the rights data protected according to PU-DRM comprises the rights data encrypted according to a symmetric key DES1 to result in DES1(rightsdata) and DES1 encrypted according to PU-DRM to result in PU-DRM(DES1), the method comprising accessing the protected rights data in the SRL by:

applying PR-DRM to PU-DRM(DES1) to result in DES1;
applying DES1 to DES1(rightsdata) to result in the rights data.

13. The method of claim 10 comprising receiving the SRL and a public key of the user PU-USER as part of a request for the license from the user, and, if the user is entitled to the license, encrypting the accessed CK according to the received PU-USER to result in PU-USER(CK) and issuing the license to the user including PU-USER(CK), whereby the user can access CK from the license by applying a private key (PR-USER) corresponding to PU-USER to PU-USER(CK) to result in CK and apply CK to CK(content) to result in the content.

14. The method of claim 10 wherein the accessed rights data includes each entity entitled to render the content and for each entity each right the entity possesses with respect to rendering the content, each entity comprising one of a user and a class of users, the method comprising reviewing the accessed rights data to determine whether the requesting user is a user entitled to render the content, and if so issuing the license to the user, the license including each right the user possesses with respect to rendering the content based on the rights data.

15. The method of claim 14 wherein the accessed rights data includes for each of at least some of the rights the entity possesses with respect to rendering the content a precondition for exercising the right, the method comprising, if the requesting user is a user entitled to render the content, issuing the license to the user, the license including each right the user possesses with respect to rendering the content based on the rights data and for each right any precondition for exercising the right based on the rights data.

16. A method in combination with digital content and a digital license corresponding to the content and issued by a license server to a user to render the content, the content being encrypted according to a content key CK to result in CK(content), CK(content) being accompanied by a signed rights label SRL, the license including CK protected according to a user key, whereby the user can access CK from the license and apply CK to CK(content) to result in the content, the license further including DES 1 encrypted according to the user key, the method comprising:

retrieving DES1 encrypted according to the user key from the license;

decrypting DES1 encrypted according to the user key to result in DES1;

retrieving DES1(rightsdata) from the SRL including CK encrypted according to a symmetric key DES1 to result in DES1(CK), rights data encrypted according to the symmetric key DES1 to result in DES1(rightsdata), DES1 encrypted according to a public key for the license server PU-DRM to result in PU-DRM(DES1), and a digital signature based on a private key PR-DRM corresponding to PU-DRM and based at least in part on DES1 (rightsdata);

applying DES1 to DES1(rightsdata) to result in the rights data;

altering the rights data as desired;

encrypting the altered rights data according to DES1 to result in DES1 (alteredrightsdata);

submitting DES1 (alteredrightsdata) and DES1 (CK) as a republished rights label to the license server for signing thereby, the license server validating the republished rights label and, if valid, creating a digital signature based on PR-DRM and based at least in part on DES1(alteredrightsdata) to result in a signed republished rights label SRRL and returning the SRRL, whereby the license server signs both the altered rights data and the content key CK;

receiving the returned SRRL and concatenating such received SRRL with CK(content) to form a content package; and distributing the content package to one or more users;

receiving from a user a request for a license corresponding to the content, the request comprising the SRRL as retrieved from the content package, whereby the license server verifying its own signature of the rights label in the received SRRL based on PU-DRM and based at least in part on DES1(alteredrightsdata), accesses DES1(alteredrightsdata) in the SRRL and reviews same to determine whether the user is entitled to the license, and if so issues the license to the user, the license including CK in a protected form accessible to the user.

17. The method of claim 16 comprising receiving the returned SRRL, stripping off the SRL from CK(content), and concatenating the received SRRL with CK(content) to form a content package.

18. The method of claim 16 wherein the license includes CK protected according to a public key of the user PU-USER to result in PU-USER(CK) and DES1 encrypted according to PU-USER to result in PU-USER(DES1), the method comprising retrieving PU-USER(DES1) from the license; and decrypting PU-USER(DES1) according to a private key of the user (PR-USER) corresponding to PU-USER to result in DES1.

19. A method of self-publishing digital content to enable a license server to issue a digital license corresponding to the content to one or more users desiring to render the content, the method comprising:

receiving from the license server an authorizing certificate including a public key PU-CERT and a corresponding private key PR-CERT encrypted according to a public key of the user PU-USER to result in PU-USER(PR-CERT), the certificate being signed by a private key of the license server PR-DRM;

encrypting the content according to a content key CK to result in CK(content);

protecting the content key CK according to a public key of the license server PU-DRM corresponding to PR-DRM;

generating rights data associated with the content;

protecting the rights data according to PU-DRM;

submitting the protected rights data and the protected content key CK) as a rights label;

obtaining PR-CERT from the received authorizing certificate;

signing the submitted rights label with the obtained PR-CERT based at least in part on the protected rights data to result in a signed rights label SRL, whereby the license server signs both the rights data and the content key CK that are protected according to PU-DRM;

concatenating the SRL and the authorizing certificate with CK(content) to form a content package; and distributing the content package to the one or more users;

receiving from a user a request for the license corresponding to the content, the request comprising the SRL and certificate as retrieved from the content package, whereby the license server verifies its own signature of the certificate based on PU-DRM, obtains PU-CERT from the certificate, whereby the license server verifies its own signature of the SRL based on the obtained PU-CERT, accesses the protected rights data in the SRL and reviews same to determine whether the user is entitled to the license, and if so issues the license to the user, the license including CK in a protected form accessible to the user.

20. The method of claim 19 wherein obtaining PR-CERT from the received authorizing certificate compromises obtaining PU-USER(PR-CERT) from the certificate and applying a private key of the user (PR-USER) corresponding to PU-USER thereto to result in PR-CERT.

21. The method of claim 19 wherein protecting the content key CK according to a public key for the license server PU-DRM comprises:

generating a symmetric key DES1;

encrypting CK according to DES1 to result in DES1(CK); and encrypting DES1 according to PU-DRM to result in PU-DRM(DES1), whereby the license server can access CK with PR-DRM.

22. The method of claim 21 further comprising discarding CK after encrypting CK according to DES1 to result in DES1(CK), whereby CK can only be obtained by decrypting DES1(CK).

23. The method of claim 19 wherein protecting the rights data according to PU-DRM comprises:

generating a symmetric key DES1;

encrypting the rights data according to DES1 to result in DES1(rightsdata);

encrypting DES1 according to PU-DRM to result in PU-DRM(DES1), whereby the license server can access the rights data with PR-DRM.

24. The method of claim 19 comprising encrypting the content according to a symmetric content key CK to result in CK(content).

25. The method of claim 19 comprising generating rights data including each entity entitled to render the content and for each entity each right the entity possesses with respect to rendering the content, each entity comprising one of a user and a class of users.

26. The method of claim 25 comprising generating rights data including for each of at least some of the rights the entity possesses with respect to rendering the content a precondition for exercising the right.

27. The method of claim 19 comprising submitting the protected rights data, the protected content key CK, and information on the content including an identifier thereof as the rights label for signing.

28. The method of claim 19 further comprising adding to the rights label information on the license server including address information for locating the license server.

* * * * *